(12) United States Patent
Books et al.

(10) Patent No.: US 9,809,210 B2
(45) Date of Patent: Nov. 7, 2017

(54) SYSTEM AND METHOD FOR DIAGNOSING FAILURES IN BRAKE SYSTEMS AND DISCRETE VEHICLE INPUTS

(71) Applicant: Cummins, Inc., Columbus, IN (US)

(72) Inventors: Martin T. Books, Columbus, IN (US); Praveen Chitradurga Muralidhar, Indianapolis, IN (US)

(73) Assignee: Cummins, Inc., Columbus, IN (US)

( * ) Notice: Subject to any disclaimer, the term of this patent is extended or adjusted under 35 U.S.C. 154(b) by 120 days.

(21) Appl. No.: 14/848,737

(22) Filed: Sep. 9, 2015

(65) Prior Publication Data

US 2017/0066427 A1   Mar. 9, 2017

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *B60T 17/22* | (2006.01) |
| *B60T 8/172* | (2006.01) |
| *B60T 8/88* | (2006.01) |

(52) U.S. Cl.
CPC ............ *B60T 17/221* (2013.01); *B60T 8/172* (2013.01); *B60T 8/885* (2013.01); *B60T 2220/04* (2013.01); *B60T 2270/413* (2013.01)

(58) Field of Classification Search
CPC ...... B60T 17/221; B60T 8/172; B60T 13/662; B60T 2270/406; B60T 17/22; Y10T 477/80; B60Q 11/00; B60W 50/0205; B60W 2540/12; B60W 2420/30; B60W 2520/10

USPC .......................................................... 701/1, 70
See application file for complete search history.

(56) References Cited

U.S. PATENT DOCUMENTS

| | | | |
|---|---|---|---|
| 6,405,117 B1 * | 6/2002 | Walenty | B60T 8/885 701/32.1 |
| 6,614,346 B2 | 9/2003 | Faye | |
| 7,630,807 B2 * | 12/2009 | Yoshimura | B60K 6/46 701/36 |
| 2006/0015231 A1 * | 1/2006 | Yoshimura | B60K 6/46 701/48 |
| 2008/0054718 A1 * | 3/2008 | Nishino | B60T 8/1755 303/146 |

(Continued)

FOREIGN PATENT DOCUMENTS

JP   03-994317   10/2007

*Primary Examiner* — Jaime Figueroa
(74) *Attorney, Agent, or Firm* — Foley & Lardner LLP

(57) ABSTRACT

A device includes at least one of a brake position sensor operationally coupled to a brake and providing a brake position signal, or a clutch position sensor operationally coupled to a clutch and providing a clutch position signal. The device further includes a controller having a communication module structured to interpret the at least one of the brake position signal or the clutch position signal, and a collection module structured to collect vehicle dynamics information. The controller further includes a vehicle dynamics module structured to interpret the vehicle dynamics information, and a sensor diagnostics module structured to determine a failure of at least one of the clutch position sensor or the brake position sensor in response to the vehicle dynamics information and at least one of the clutch signal or the brake signal.

25 Claims, 5 Drawing Sheets

(56) References Cited

U.S. PATENT DOCUMENTS

| | | | |
|---|---|---|---|
| 2010/0030421 A1* | 2/2010 | Yoshimura | B60K 6/46 |
| | | | 701/31.4 |
| 2010/0049414 A1* | 2/2010 | Ohtomo | B60L 3/08 |
| | | | 701/70 |
| 2010/0152959 A1 | 6/2010 | Cuny et al. | |
| 2011/0190979 A1* | 8/2011 | Monti | B60T 7/122 |
| | | | 701/33.4 |
| 2012/0191295 A1 | 7/2012 | Zettel et al. | |
| 2014/0188343 A1* | 7/2014 | Yoshimura | B60K 6/46 |
| | | | 701/41 |

* cited by examiner

| Discrete Input | Diagnosis | Number of Recorded Instances |
|---|---|---|
| Service Brake | Never Engaged | 2 |
| Service Brake | Always Engaged | 2 |
| Parking Brake | Always Engaged | 1 |

SYSTEM AND METHOD FOR DIAGNOSING FAILURES IN BRAKE SYSTEMS AND DISCRETE VEHICLE INPUTS

TECHNICAL FIELD

This disclosure relates to systems and methods for vehicle diagnostics, including tools for diagnosing failures in vehicle systems such as brakes and clutches.

BACKGROUND

Hybrid vehicles and electric vehicles are gaining popularity due to their lowered operating costs and environmental benefits, among other reasons. The lowered operating costs may be attributable both to efficiency improvements in vehicle operation and the capability to rely on an energy source that is comparatively lower in cost than fuel (such as in the case of plug-in electric vehicles, for example). In particular, for vehicles with electric motor drive systems, one of the most significant efficiency improvements is the ability to perform regenerative braking, which converts a vehicle's kinetic energy to electrical energy during vehicle deceleration, and then stores the energy. Another significant efficiency improvement is the ability to shut down parts of the vehicle's power system when the vehicle is stopped, thereby eliminating engine idling, which is typical of vehicles equipped with internal combustion engines.

In hybrid vehicles, starting and stopping of the engine and regenerative braking are typically triggered by the driver depressing the brake pedal. To provide appropriate inputs to a system computer, such vehicles typically employ a simple switch as a position sensor on a brake pedal. The system computer cannot gauge a degree of pedal motion and is limited to determining whether there is an indication that the pedal is depressed. The brake pedal switch is typically used for non-critical control functions and used to control illumination of rear brake lights of the vehicle. The typical switch configuration presents a single-point-of-failure mode for hybrid or electric vehicles in terms of energy-savings functionality. Further, diagnosing failures of discrete inputs such as brake switches is difficult due to the limitations of out-of-range, open-circuit and short-circuit detection techniques.

SUMMARY

Various embodiments provide devices, methods and systems for diagnosing failures of sensors for brakes and other discrete vehicle inputs. Such embodiments mitigate the likelihood of having a failure of a brake sensor go undiagnosed. In particular, such embodiments facilitate determination of whether a malfunction is occurring during energy-savings processes for hybrid or electric vehicles—e.g., regenerative braking performance and power-system shutoff during idling. Further, various embodiments may mitigate or eliminate the need for costly sensors or redundant sensor systems that increase overall system costs.

Various embodiments provide a device that includes a brake position sensor operationally coupled to a brake and providing a brake position signal, and a clutch position sensor operationally coupled to a clutch and providing a clutch position signal. The device further includes a controller having a communication module structured to interpret the brake position signal and the clutch position signal, and a collection module structured to collect vehicle dynamics information. The controller further includes a vehicle dynamics module structured to interpret the vehicle dynamics information, and a sensor diagnostics module structured to determine a failure of at least one of the clutch position sensor and the brake position sensor in response to the vehicle dynamics information and at least one of the clutch signal and the brake signal.

Various embodiments provide a method comprising operationally coupling a brake position sensor to a brake, and providing a brake position signal. The method further includes operationally coupling a clutch position sensor to a clutch, and providing a clutch position signal. The method still further includes interpreting, using a controller, the brake position signal, the clutch position signal, and vehicle dynamics information, and determining, using the controller, a failure of at least one of the clutch position sensor and the brake position sensor in response to the vehicle dynamics information and at least one of the clutch signal and the brake signal.

Various embodiments provide for a system comprising a hybrid vehicle comprising a hybrid engine, at least one brake, and a clutch, a brake position sensor operationally coupled to the at least one brake and providing a brake position signal, and a clutch position sensor operationally coupled to the clutch and providing a clutch position signal. The system further includes a controller having a communication module structured to interpret the brake position signal and the clutch position signal, a collection module structured to collect vehicle dynamics information, a vehicle dynamics module structured to interpret the vehicle dynamics information, and a sensor diagnostics module structured to determine a failure of at least one of the clutch position sensor and the brake position sensor in response to the vehicle dynamics information and at least one of the clutch signal and the brake signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive devices, methods and systems for diagnosing failures of sensors for brake systems and other discrete vehicle inputs. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various embodiments provide for devices, methods and systems which diagnose brake and clutch malfunctions without requiring redundant sensors or costly analog sensors. In particular, by measuring vehicle dynamics information (e.g., acceleration and deceleration), actual activity or the absence of activity of brake and transmission systems may be inferred. Further, various embodiments may also account for various environmental conditions affecting vehicle operation and vehicle dynamics performance, such as the grade of a road on which the vehicle is located. Based on the correlation between vehicular motion and the sensed activity of the brake or clutch, functioning of brake or clutch sensors may be validated in a cost-efficient manner.

Figure 1:
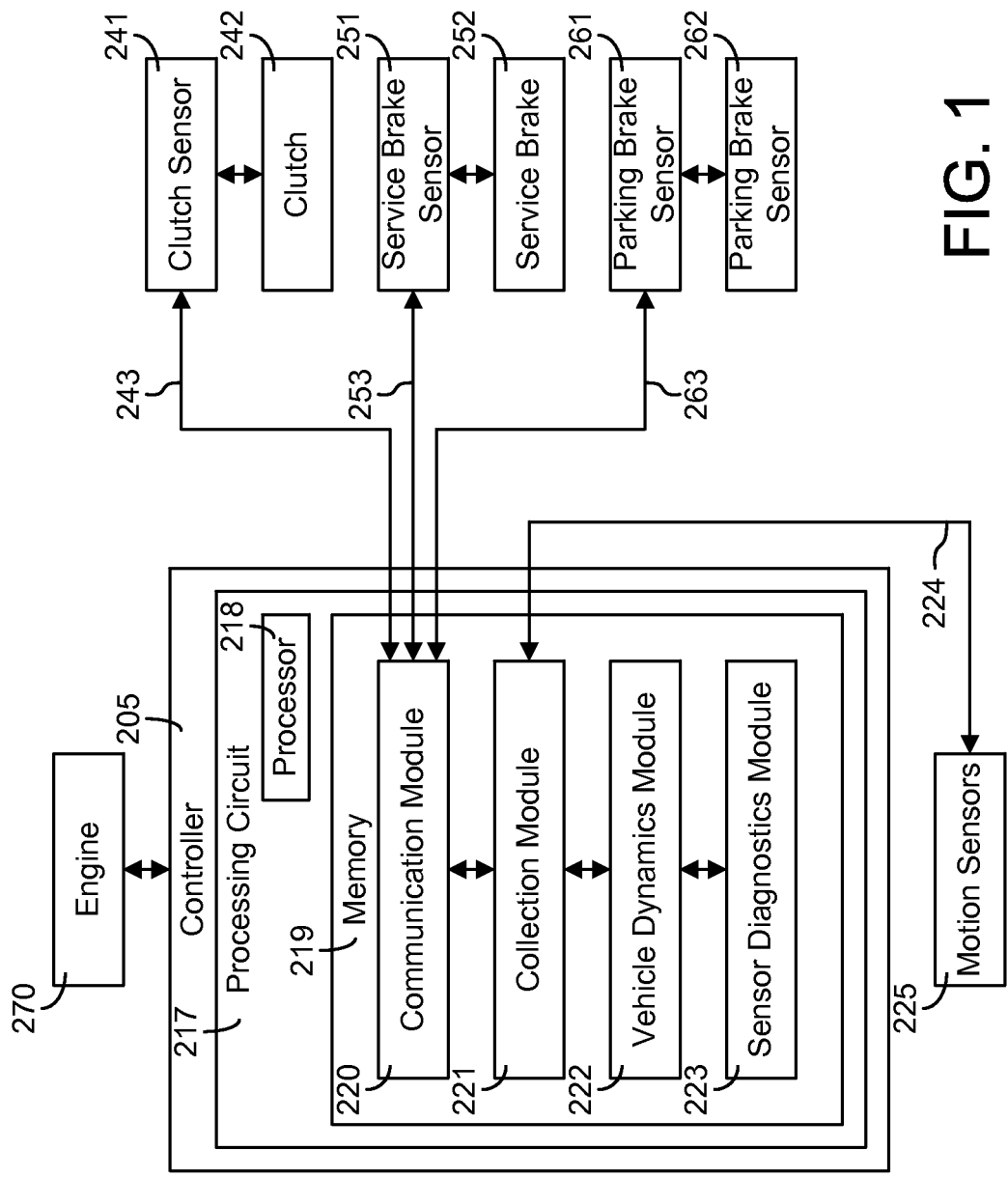
FIG. 1 illustrates a schematic of a system, in accordance with example embodiments.

FIG. 1 illustrates a schematic of a control system in accordance with example embodiments. A controller 205 is shown as including a processing circuit 217 including a processor 218 and a memory 219. The processor 218 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 219 (e.g., RAM, ROM, Flash Memory, hard disk storage, etc.) may store data and/or computer code for facilitating the various processes described herein. Thus, the one or more memory devices 219 may be communicably connected to the processor 218 and provide computer code or instructions to the processor 218 for executing the processes described in regard to the controller 205 herein. Moreover, the one or more memory devices 219 may be or include tangible, non-transient volatile memory or non-volatile memory. Accordingly, the one or more memory devices 219 may include database components, object code components, script components, or any other type of information structure for supporting the various activities and information structures described herein.

Certain operations of the controller 205 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The memory is shown to include various modules for completing the activities described herein. More particularly, the controller 205 includes one or more modules structured to functionally execute the operations of the controller. As shown in FIG. 1, the controller 205 may include one or more modules, in particular, a communication module 220, a collection module 221, a vehicle dynamics module 222, and a sensor diagnostics module 223.

In particular, the communication module 220 is structured to communicate with at least one brake sensor and a clutch sensor. As shown in FIG. 1, a clutch sensor 241, a service brake sensor 251 and a parking brake sensor 261 are respectively coupled to a clutch 242, a service brake 252 and a parking brake 262. Each of the sensors is configured to output a position signal. For example, clutch sensor 241 outputs clutch position signal 243, service brake sensor 251 outputs a service brake position signal 253, and parking brake sensor 261 outputs parking brake position signal 263. The communication module 220 is structured to interpret the brake position signals 253 and 263, along with the clutch position signal 243.

Repeated significant vehicle decelerations are indicative of brake activity, which may be accompanied by detectable toggling of brake position sensors 251 or 261. Absence of transitions of at least one of the brake position sensors 251, 261 is indicative of failure of at least one of the brake position sensors 251, 261. Similarly, frequent or constant toggling (i.e., transitioning) of at least one of the brake position sensors 251, 261 during periods of vehicle acceleration is indicative of failure of at least one of the brake position sensors 251, 261. The sensor diagnostics module 223 discussed below is structured to infer braking activity by examining a sustained rate of change of vehicle speed, a peak rate of change of vehicle speed, and a net drop in vehicle speed (i.e., traversing two speed thresholds) over a particular period of time, among other considerations.

Referring again to FIG. 1, the collection module 221 is structured to collect vehicle dynamics information. The collection module 221 is structured to receive data 224 indicative of various dynamic phenomena for the vehicle, including phenomena related to engine dynamics. The data 224 may include, but is not limited to, vehicle acceleration and vehicle deceleration data, which may be provided via one or more sensors 225 coupled to the vehicle (or and/or determined via one or more formulas, algorithms, processes, and the like based on operating data). In this regard, the collection module 221 may be electrically coupled to the vehicle or to the various sensors 225 via transmission pathway for one or two-way communication. The sensors 225 may include an accelerometer, a yaw sensor, and a grade sensor measuring the degree of inclination of a road surface, among other types of sensors.

The collection data 224 provides an indication of certain conditions of the vehicle. The data 224 may include, but is not limited to, an indication of a braking event, a vehicle speed and changes thereto (e.g., rapid increases or decreases), a sustained period of vehicle speed, an engine speed, an indication of a gear shifting event, and any other piece of data indicative of the dynamic conditions of the vehicle. The data 224 can be provided via one or more sensors 225 and/or determined via various look-up tables, models, formulas, processes, and/or algorithms.

With reference again to FIG. 1, the vehicle dynamics module 222 shown therein is structured to interpret vehicle dynamics information. More specifically, the vehicle dynamics module 222 is structured to interpret the vehicle dynamics information collected by the collection module 221. Further, the sensor diagnostics module 223 shown therein is structured to determine a failure of at least one of the clutch position sensor 241, the service brake position sensor 251 and the parking brake position sensor 261 in response to the vehicle dynamics information and at least one of the clutch position signal 243, the service brake position signal 253 and the parking brake position signal 263.

By way of example, the vehicle dynamics module 222 and the sensor diagnostics module 223 may be used to draw inferences of whether any of the sensors associated with the clutch 242, the service brake 252 or the parking brake 262 is experiencing a malfunction. For example, there may be an indication that the service brake 252 is never engaged (i.e., depressed) over a given time period (such as a usage cycle of a half-hour time period corresponding to an average daily one-way commute of a driver, for example).

Figures 5, 6:
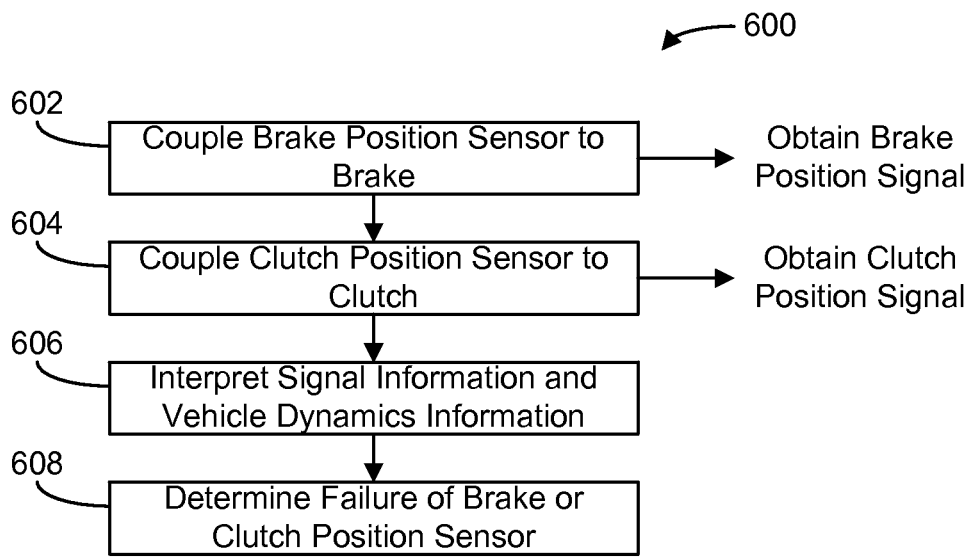
FIG. 5 illustrates data collection in accordance with the diagnostic scenarios of FIGS. 2-4.
FIG. 6 illustrates a flow diagram for a system to diagnose sensor failures, in accordance with example embodiments.

If the service brake position sensor 251 indicates that the service brake 252 is never engaged, it may be expected that the vehicle does not rapidly decelerate. Yet, if rapid decelerations are observed, such decelerations are generally not attainable without engagement of the service brake 252. Thus, this discrepancy is indicative of a potential error in the service brake position sensor 251. Accordingly, the number of instances in which the service brake pedal is never sensed to be depressed despite observed rapid vehicle decelerations is recorded by the controller 205, as indicated in FIG. 5.

Figure 2:
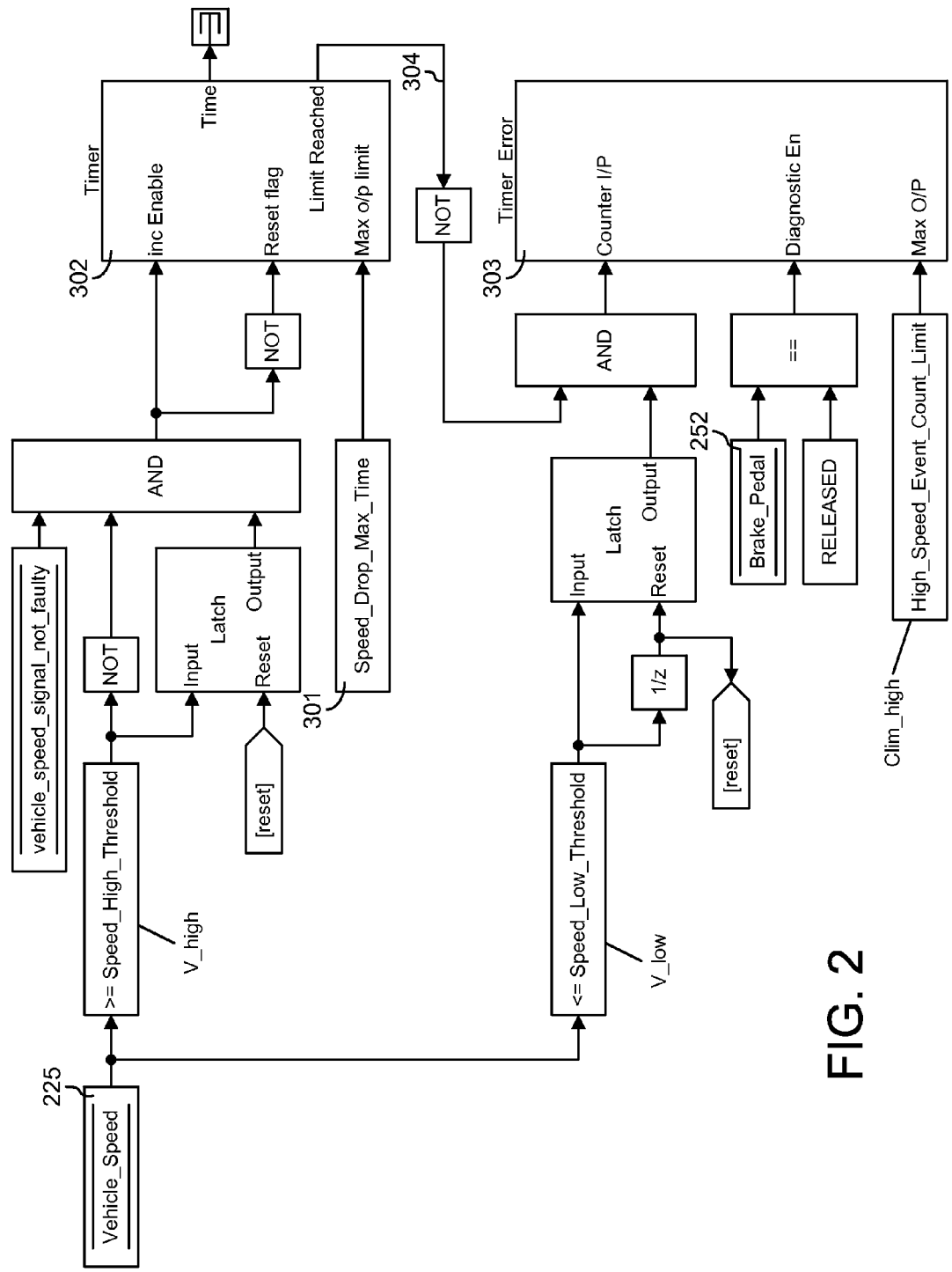
FIG. 2 illustrates a first diagnostic scenario.

In particular, as shown in FIG. 2, the sensor diagnostics module 223 is configured to compare a vehicle speed, based on information obtained from the collection module 221, to a first speed value that is a high speed threshold V_high (e.g., 20 mph). Specifically, the sensor diagnostics module 223 compares whether the vehicle speed is equal to or above the first speed value. If the vehicle speed is equal to or above the first speed value, the sensor diagnostics module 223 then evaluates how long it takes for the vehicle speed to drop from the first speed value to a second speed value that is a lower speed threshold (e.g., zero mph or 2 mph). The sensor diagnostics module may count how long it takes for the speed to drop from V_high to V_low using a timer 302. The timer block 302 is used as a duration timer that counts how long vehicle speed has been below a high threshold V_high, having previously been above the threshold, and outputs a flag 304 when the timed duration reaches the maximum stop time associated with a moderate braking event 301.

The controller 205 then checks to see if vehicle speed has reached the low speed threshold V_low while the timer 302 output flag 304 still indicates a duration less than that associated with a moderate braking event (e.g., statistically derived average times for a moderate braking event for a particular class of vehicle or a particular make and/or model) but specifically determined to be a time that could not be repeatedly achieved over varying terrain without the assistance of a service brake. A moderate braking event may be, for example, braking typical of a regular, non-emergency stop on a residential surface street.

If the time it takes for the vehicle speed to descend to the lower speed (e.g., 0 mph) is consistent with the time period associated with a moderate to aggressive braking event, i.e., short in duration, then the sensor diagnostics module 223 may determine that the service brake position sensor 251 is experiencing a malfunction if the service brake position sensor 251 indicates that the service brake 252 is never depressed.

Further, if the vehicle speed has been dropping for some time which is less than the moderate braking event and the vehicle speed has actually reached the lower speed, then the service brake 252 is reasonably expected to be engaged. Accordingly, based on such information, the sensor diagnostics module 223 diagnoses the service brake position sensor 251 as experiencing a malfunction if it indicated a constantly released stated of the service brake 252. Moreover, the controller 205 records the number of times that such circumstances were observed. Further, the controller 205 is configured to count the number of instances in which (1) the vehicle speed sensor 225 information indicates that the vehicle speed has been dropping for a given period of time which is less than the moderate braking event, (2) the vehicle speed has actually reached the lower speed, and (3), the service brake 252 is indicated to be continually released, and to compare the counted number of instances to a high speed count limit Clim_high, as indicated in FIG. 2.

As a further example, there may be an indication by the service brake position sensor 251 that the service brake 252 is always engaged. If the service brake 252 is always engaged, then it is difficult to obtain rapid vehicle accelerations from a vehicle stop at a first speed value (i.e., from a starting speed of zero) to a second speed value of high speed (e.g., 50 mph). If, for example, the vehicle were observed to accelerate with a few seconds from the first speed value to the second speed value, the service brake pedal 252 may not be expected to be engaged during such a swift acceleration. Thus, the sensed engagement of the service brake 252 during such a period may indicate the presence of a malfunction of the service brake position sensor 251. Accordingly, the controller 205 may record the number of instances in which this discrepancy is recorded, as indicated in FIG. 5.

Figure 3:
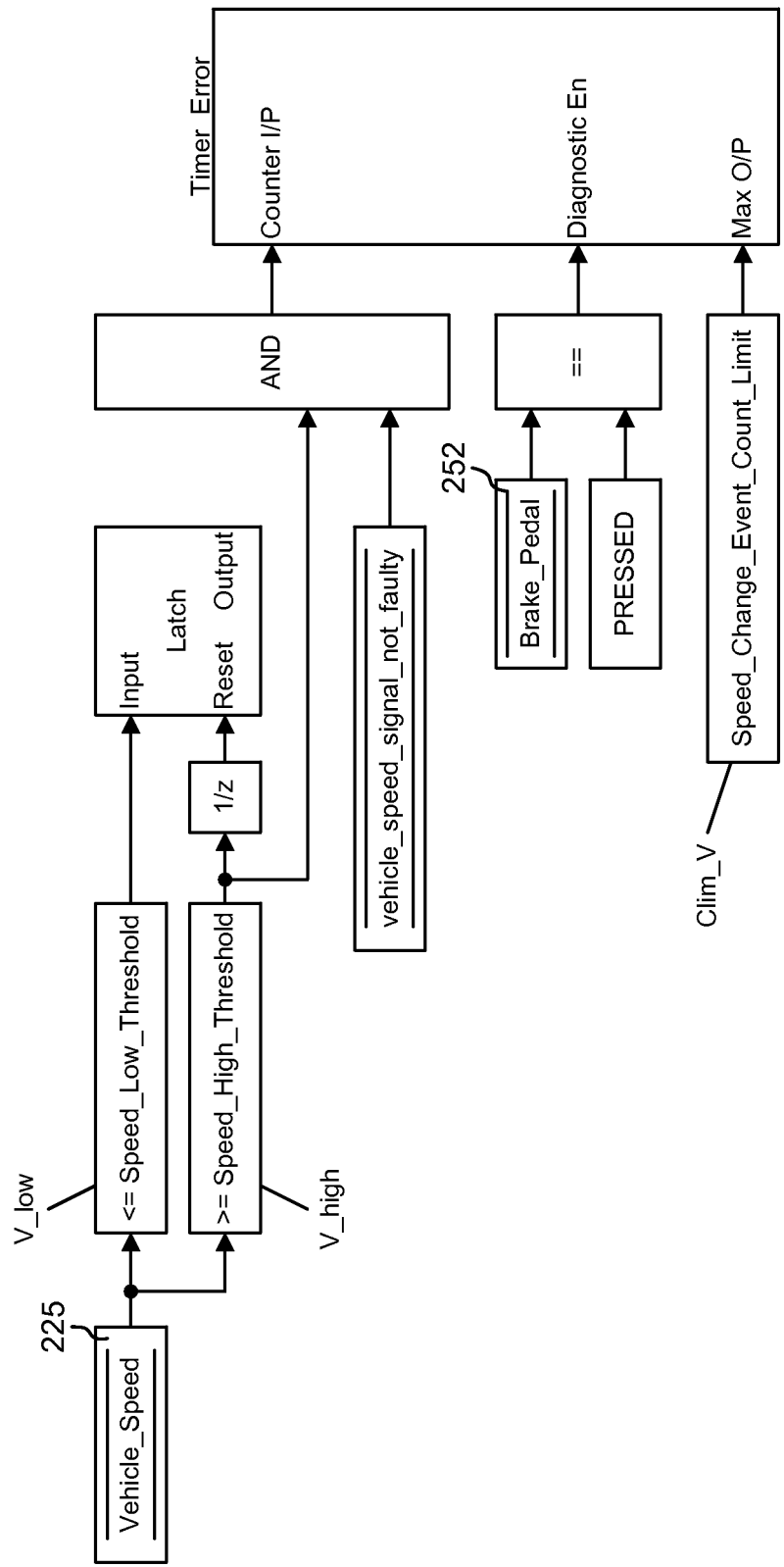
FIG. 3 illustrates a second diagnostic scenario.

In particular, as shown in FIG. 3, the sensor diagnostics module 223 may also determine a malfunction of the service brake 252 when the service brake position sensor 251 indicates that the service brake 252 is always engaged (i.e., depressed). For example, consider a situation in which the vehicle speed is observed by the collection module 221 to go from the second speed value that is a low speed threshold V_low (e.g., less than 1 mph) to the first speed value that is a high speed threshold (e.g., at least 20 mph). If the vehicle speed is observed to increase from the second speed value to the first speed value and a vehicle speed sensor (which may be provided as part of sensors 225) is functioning properly, then the controller 205 judges that the vehicle is accelerating. Such a finding is inconsistent with information from the service brake position sensor 251 indicating that the service brake 252 is always engaged (i.e., depressed).

In other words, if the vehicle is accurately judged to be accelerating, it does not follow that the service brake 252 is continuously engaged. If the service brake position sensor 251 indicated so, then the sensor diagnostics module 223 may determine that the service brake position sensor 251 is experiencing a malfunction. In particular, the controller 205 is configured to count a number of instances in which the vehicle speed is cycled from the low speed threshold V_low to the high speed threshold V_high (e.g., from the second to the first speed values) while the service brake position sensor 251 indicates a continual engagement of the service brake 252. If the controller 205 counts a number of instances that is equal to or above a threshold Clim_V, then the sensor diagnostics module 223 may conclude that the service brake position sensor 251 is malfunctioning. In particular, if such circumstances are recorded by the controller 205 on multiple occasions, as shown in FIG. 5, then the confidence of the failure determination made by the sensor diagnostics module 223 increases.

As yet another illustrative example, the vehicle dynamics module 222 and the sensor diagnostics module 223 may be used to draw inferences as to whether the parking brake position sensor 261 associated with parking brake 262 is experiencing a malfunction. If the parking brake 262 is sensed to always be engaged by the parking brake position sensor 261, then the vehicle is likely unable to attain sustained periods of high speed if the parking brake 262 were actually engaged continuously over the sustained period. In other words, the parking brake position sensor 261 may be experiencing a malfunction if it indicates that the parking brake 262 is always engaged, yet the vehicle spends long periods of time at high speed.

Thus, the controller 205 is structured to record the number of instances in which the parking brake position sensor 261 indicates that the parking brake 262 is always engaged, but the vehicle reaches a speed above a first speed value and remains at that speed for a predetermined time period, as indicated in FIG. 5. For example, as indicated in FIG. 5, the controller 205 may record the number of times in which the vehicle speed is observed to be at or above a high speed V_high while the parking brake 262 is sensed to be continually engaged for a cumulative amount of time T_diag (e.g., five minutes), and to determine a failure of the brake position sensor 261 based on such information. As a further example, constant sensing that the parking brake 262 is engaged while the vehicle freely accelerates and cruises is indicative of a failure of the parking brake position sensor 261. On a vehicle equipped with a grade sensor, lack of vehicular motion without activation of service brakes (e.g., service brake 252) may also indicate engagement of the parking brake 262. When the parking brake position sensor 261 is properly functioning, then the parking brake position sensor 261 senses that the parking brake 262 is being engaged if the vehicle is stopped on a road with a steep grade.

Figure 4:
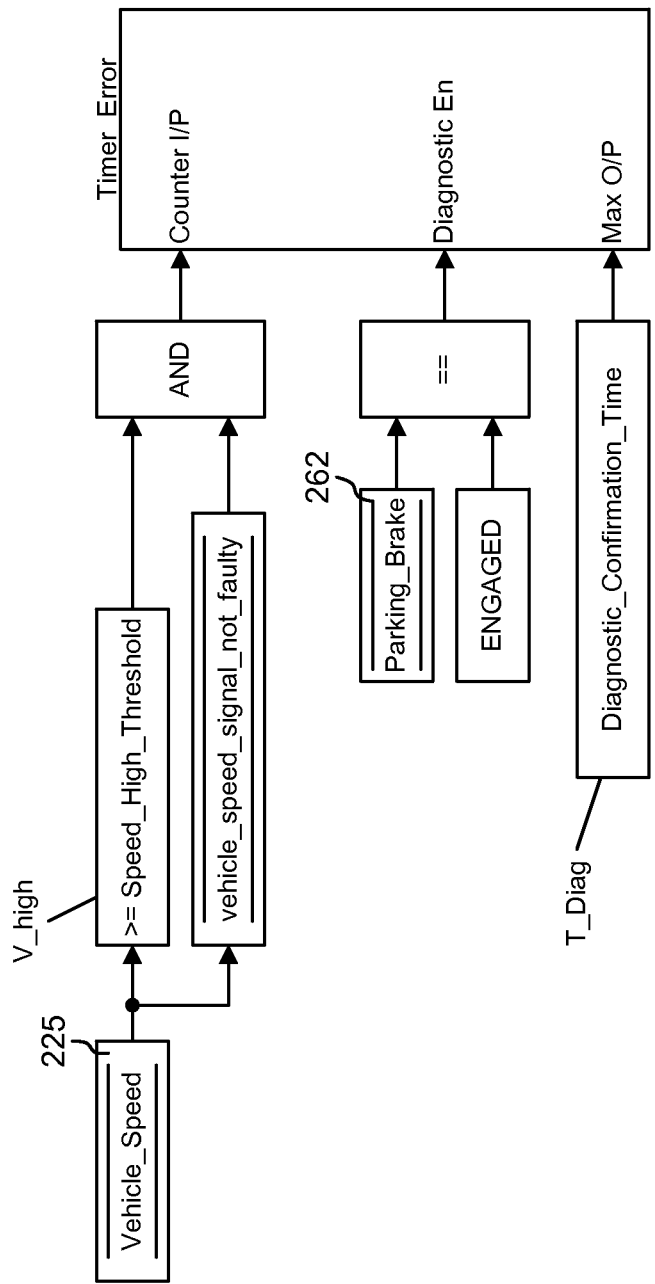
FIG. 4 illustrates a third diagnostic scenario.

In particular, as shown in FIG. 4, consider a scenario in which the parking brake 262 is indicated by the parking brake position sensor 261 to always be engaged over a given period of time (e.g., five minutes). The vehicle speed may be determined by the collection module 221 (in reliance on sensors 225, for example) to be high. For example, the vehicle speed may be measured as being above a third speed value that is a high speed threshold (e.g., higher than 60 mph). If the sensors 225 accurately measure the vehicle speed, and the speed is measured as being above the third speed value, then it is expected that the parking brake 262 is not engaged.

Accordingly, if the parking brake 262 is sensed as always being engaged by the parking brake position sensor 261 during the given time period despite the observation of speed above the third speed value, the sensor diagnostics module 223 may determine that the parking brake position sensor 261 is malfunctioning. The number of occurrences of such circumstances may be recorded. If a certain number (e.g., five such times) were counted, the sensor diagnostics module 223 may increase a statistical confidence level for the conclusion that the parking brake position sensor 261 is malfunctioning.

The foregoing diagnostic approaches may be implemented in a variety of vehicles, including but not limited to traditional diesel engines, diesel-electric hybrid engines and plug-in hybrid electric vehicles. Inasmuch as hybrid power systems are especially dependent on regenerative braking and on controlling idling in order to maximize fuel economy, obtaining accurate diagnostic assessments of brake and clutch failures is of particular importance. Moreover, the foregoing diagnostic approach may also be integrated in vehicles with conventional internal combustion engines, without requiring modifications to non-engine components such as brake systems. In other words, the techniques of the present disclosure may be implemented in a wide variety of vehicles without necessitating development of unique brake pedals.

As indicated above, the sensor diagnostics module 223 may be structured to diagnose a failure not based on a specific deceleration rate trigger but by accounting for a frequent rapid acceleration and stopping of the vehicle. A single launch above a lower speed threshold followed by a return to the lower speed threshold (0) mph is unlikely without any actual braking. Repeated accelerations and returns to the lower speed threshold may represent an actual braking scenario with high confidence. While repeated vehicle stops could be accomplished on a long uphill grade, full vehicle stops without rolling backwards could not be accomplished on that same grade. Thus, the vehicle behavior over time—specifically, acceleration and deceleration behavior—may be used to ascertain the presence or absence of a malfunction.

A similar approach may be implemented in various embodiments to diagnose failures of the clutch position sensor 241 for the clutch 242, e.g., on a vehicle equipped with a manual transmission. In this situation, vehicle acceleration or sustained high torque may not be expected if the clutch position sensor 241 indicated disengagement of the clutch 242. Likewise, a constant and stable correlation between engine rpm and a driveshaft speed or vehicle speed (i.e., a constant gear ratio) may be indicative of engagement of the clutch 242, which may be accompanied by the clutch position sensor 241 indicating that the clutch 242 is not engaged. As with the brake position sensors 251 and 261, instances of discrepancies between information gleaned from the clutch position sensor 241 and inferred vehicle activity may be recorded by the controller 205.

In addition, the communication module 220 may trigger stopping and/or starting of an engine of a vehicle and may provide an instruction for regenerative braking based on information derived from at least one of the clutch position sensor 241 and the brake position sensors 251, 261. For example, to provide the controller 205 with an input, the communication module 220 is configured to communicate with the engine of a vehicle so as to indicate a regenerative braking initiation time when regenerative braking should be started based on information derived from the at least one of the sensors 241, 251, 261.

Referring now to FIG. 6, a flow diagram 600 for diagnosing failures in a brake or clutch sensor is illustrated in accordance with example embodiments. FIG. 6 illustrates processes which are implementable by the controller 205.

The processes including operationally coupling a brake position sensor 251 to a service brake 252 shown in FIG. 1, and providing a brake position signal (process 602). In some implementations, the processes additionally or alternatively include operationally coupling a brake position sensor 261 to a parking brake 262, shown in FIG. 1. Further processes include operationally coupling a clutch position sensor 241 to a clutch 242, shown in FIG. 1, and providing a clutch position signal (process 604).

Additionally, the processes further include interpreting, using a controller (such as the controller 205, for example), the brake position signal and the clutch position signal from the respective sensors 251, 241, along with vehicle dynamics information (process 606). The vehicle dynamics information may include information derived from a plurality of sensors such as sensors 225 shown in FIG. 1. For example, the vehicle dynamics information may include speed information from a speed sensor. In this manner, the controller 205 may compare a speed of the vehicle to the thresholds V_low, V_high discussed above in relation to FIGS. 2-4. Moreover, the controller 205 may further interpret information relating to an operational environment of a vehicle, such as the grade of road on which the vehicle is running.

Further, the processes include determining, using the controller 205, a failure of at least one of the clutch position sensor 241, the service brake position sensor 251 and the parking brake position sensor 261 in response to the vehicle dynamics information and at least one of the clutch signal and the brake signal (process 608). For example, the controller 205 may determine that the service brake position sensor 251 is malfunctioning because the service brake position sensor 251 indicates that the service brake 252 is never depressed, despite the vehicle speed dropping from V_high to V_low in less than the time associated with a moderate braking event, the vehicle speed sensed by sensors 225 being the lower speed, and the service brake 252 being continually released for a number of instances Clim_high.

Further, determining the failure of at least one of the clutch position sensor 241, the service brake position sensor 251 and the parking brake position sensor 261 (process 608) may entail determining a failure of the service brake position sensor 251 based on the service brake position sensor 251 indicating that the service brake 252 is always depressed in accordance with FIG. 3 and its description above. In addition, determining the failure of the parking brake position sensor 261 may entail determining a failure of the parking brake position sensor 261 based on the parking brake position sensor 261 indicating that the parking brake 262 is always engaged, in accordance with FIG. 4 and its foregoing description. Further still, additional logic functions may be used to supplement the processes described above.

Further, the diagnostic approach of the various embodiments may be applied to single switch-type brake pedal position sensors or for in-range fault detection of more sophisticated or analog pedal sensors. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. Descriptions of certain embodiments of controller operations are included in the discussion of the processes shown in FIG. 6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Modules may also be implemented in at least one machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in a machine-readable medium (or a computer-readable medium), the computer readable program code may be stored and/or propagated on in at least one computer readable medium.

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of at least one computer readable storage medium and at least one computer readable signal medium. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

With the above description, the foregoing represent optional embodiments and configurations for the controller 205. Variations described above may be used independently or in combination with one another.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" may mean electronically coupled. The term "coupled" may mean the connection or joining of two elements directly or indirectly to one another. Such coupling may be achieved with the two elements or the two elements and any additional intermediate elements connected to one another. Such coupling may be permanent, removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e.

"one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to the features after the transitional phrases.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A device comprising:
a brake position sensor operationally coupled to a brake and providing a brake position signal, and
a controller including
a communication module structured to interpret the brake position signal,
a collection module structured to collect vehicle dynamics information,
a vehicle dynamics module structured to interpret the vehicle dynamics information, and
a sensor diagnostics module structured to determine a failure of the brake position sensor in response to the vehicle dynamics information and the brake signal,
wherein the vehicle dynamics module is further structured to determine the presence of at least one of a vehicle acceleration event and a vehicle deceleration event, and
wherein the sensor diagnostics module is further structured to determine the failure of the brake sensor in response to the at least one of the vehicle acceleration event and the vehicle deceleration event, and to determine a duration of the brake position signal indicating engagement of a service brake.

2. A device comprising:
a brake position sensor operationally coupled to a brake and providing a brake position signal, and
a controller including
a communication module structured to interpret the brake position signal,
a collection module structured to collect vehicle dynamics information,
a vehicle dynamics module structured to interpret the vehicle dynamics information, and
a sensor diagnostics module structured to determine a failure of the brake position sensor in response to the vehicle dynamics information and the brake signal,
wherein the vehicle dynamics module is further structured to determine the presence of at least one of a vehicle acceleration event and a vehicle deceleration event, and
wherein the sensor diagnostics module is further structured to determine the failure of the brake sensor in response to the at least one of the vehicle acceleration event and the vehicle deceleration event, and to determine a duration of the brake position signal indicating engagement of a parking brake.

3. A device comprising
a brake position sensor operationally coupled to a brake and providing a brake position signal, and
a controller including
a communication module structured to interpret the brake position signal,
a collection module structured to collect vehicle dynamics information,
a vehicle dynamics module structured to interpret the vehicle dynamics information, and
a sensor diagnostics module structured to determine a failure of the brake position sensor in response to the vehicle dynamics information and the brake signal,
wherein the vehicle dynamics module is further structured to
determine an estimated stop timing of a braking event, and
interpret a duration of the vehicle deceleration event,
in the vehicle deceleration event, a speed of a vehicle drops from a first speed value to a lower speed value, and
wherein the sensor diagnostics module is further structured to determine the failure of the brake sensor in response to the duration of the vehicle deceleration event and a brake signal value during the vehicle deceleration event.

4. A device comprising:
a brake position sensor operationally coupled to a brake and providing a brake position signal, and
a controller including
a communication module structured to interpret the brake position signal,
a collection module structured to collect vehicle dynamics information,
a vehicle dynamics module structured to interpret the vehicle dynamics information, and
a sensor diagnostics module structured to determine a failure of the brake position sensor in response to the vehicle dynamics information and the brake signal,
wherein the vehicle dynamics module is further structured to
determine a duration of the vehicle acceleration event, and
compare the duration of the vehicle acceleration event to a time period so as to determine the failure of the brake position sensor, and
wherein in the vehicle acceleration event, a speed of a vehicle increases from below a first speed value to above a second speed value.

5. The device of claim 1, wherein the communication module is configured to indicate a time to initiate regenerative braking based on information derived from the brake position sensor.

6. The device of claim 1, wherein:
the vehicle dynamics module is further structured to
determine a duration of sustained speed of a vehicle, and
compare the duration of the sustained speed to information from the sensor diagnostics module so as to determine the failure of the brake position sensor, the sustained speed being a speed above a first speed value.

7. The device of claim 2, wherein the duration of the vehicle deceleration event or the duration of the vehicle acceleration event occurs during a service brake failure, a parking brake failure or a clutch failure.

8. A method comprising:
operationally coupling a brake position sensor to a brake and providing a brake position signal interpreting, using a controller, the brake position signal, and vehicle dynamics information,
determining, using the controller, a failure of the brake position sensor in response to the vehicle dynamics information and the brake signal,
determining the presence of at least one of a vehicle acceleration event and a vehicle deceleration event, and
determining failure of the brake sensor in response to the at least one of the vehicle acceleration event and the vehicle deceleration event, and determining a duration of the brake position signal indicating engagement of a service brake.

9. A method comprising:
operationally coupling a brake position sensor to a brake and providing a brake position signal interpreting, using a controller, the brake position signal, and vehicle dynamics information,
determining, using the controller, a failure of the brake position sensor in response to the vehicle dynamics information and the brake signal,
determining the presence of at least one of a vehicle acceleration event and a vehicle deceleration event, and
determining failure of the brake sensor in response to the at least one of the vehicle acceleration event and the vehicle deceleration event, and determining a duration of the brake position signal indicating engagement of a parking brake.

10. The method of claim 9, further comprising:
determining an estimated stop timing of a braking event, and
interpreting a duration of the vehicle deceleration event,
wherein, in the vehicle deceleration event, a speed of a vehicle drops from a first speed value to a lower speed, and
wherein failure of the brake sensor is determined in response to the duration of the vehicle deceleration event and a brake signal value during the vehicle deceleration event.

11. The method of claim 9, further comprising:
determining a duration of the vehicle acceleration event, and
comparing the duration of the vehicle acceleration event to vehicle sensor information so as to
determine the failure of the brake position sensor,
wherein in the vehicle acceleration event, a speed of a vehicle increases from below a first speed value to above a second speed value.

12. The method of claim 8, further comprising:
communicating with an engine of a vehicle so as to indicate a restart time of the engine based on information derived from the brake position sensor.

13. A method comprising:
operationally coupling a brake position sensor to a brake and providing a brake position signal interpreting, using a controller, the brake position signal, and vehicle dynamics information,
determining, using the controller, a failure of the brake position sensor in response to the vehicle dynamics information and the brake signal,
determining a duration of sustained speed of a vehicle, and
comparing the duration of the sustained speed to vehicle sensor information to determine the failure of the brake position sensor,
wherein the sustained speed is a speed above a first speed value.

14. The device of claim 9, wherein the duration of the vehicle deceleration event or the duration of the vehicle acceleration event occurs during a service brake failure, a parking brake failure or a clutch failure.

15. A system comprising:
a hybrid vehicle comprising a hybrid engine, at least one brake, and a clutch;
at least one of: a brake position sensor operationally coupled to the at least one brake and providing a brake position signal, or a clutch position sensor operationally coupled to the clutch and providing a clutch position signal,
a controller including:
a communication module structured to interpret the at least one of the brake position signal or the clutch position signal,
a collection module structured to collect vehicle dynamics information,
a vehicle dynamics module structured to interpret the vehicle dynamics information,
a sensor diagnostics module structured to determine a failure of the at least one of the clutch position sensor or the brake position sensor in response to the vehicle dynamics information and the at least one of the clutch signal or the brake signal,
wherein the vehicle dynamics module is further structured to determine the presence of at least one of an acceleration event and a deceleration event of the hybrid vehicle, and
wherein the sensor diagnostics module is further structured to determine the failure of the brake sensor in response to the at least one of the acceleration event and the deceleration event, and to determine a duration of the brake position signal indicating engagement of a service brake.

16. The system of claim 15, wherein the vehicle further comprises an electric motor drive system.

17. A system comprising:
a hybrid vehicle comprising a hybrid engine, at least one brake, and a clutch;
at least one of: a brake position sensor operationally coupled to the at least one brake and providing a brake position signal, or a clutch position sensor operationally coupled to the clutch and providing a clutch position signal,
a controller including:

a communication module structured to interpret the at least one of the brake position signal or the clutch position signal, a collection module structured to collect vehicle dynamics information, a vehicle dynamics module structured to interpret the vehicle dynamics information, a sensor diagnostics module structured to determine a failure of the at least one of the clutch position sensor or the brake position sensor in response to the vehicle dynamics information and the at least one of the clutch signal or the brake signal, wherein the vehicle dynamics module is further structured to determine the presence of at least one of an acceleration event and a deceleration event of the hybrid vehicle, and wherein the sensor diagnostics module is further structured to determine the failure of the brake sensor in response to the at least one of the acceleration event and the deceleration event, and to determine a duration of the brake position signal indicating engagement of a parking brake.

18. A method comprising:

operationally coupling at least one of a brake position sensor to a brake or a clutch position sensor to a clutch, and providing at least one of a brake position signal or a clutch position signal, interpreting, using a controller, the at least one of the brake position signal or the clutch position signal, and vehicle dynamics information, determining, using the controller, a failure of at least one of the clutch position sensor or the brake position sensor in response to the vehicle dynamics information and the at least one of the clutch signal or the brake signal, determining the presence of at least one of a vehicle acceleration event and a vehicle deceleration event, and determining failure of the brake sensor in response to the at least one of the vehicle acceleration event and the vehicle deceleration event, and determining a duration of the brake position signal indicating engagement of a service brake.

19. A method comprising:

operationally coupling at least one of a brake position sensor to a brake or a clutch position sensor to a clutch, and providing at least one of a brake position signal or a clutch position signal, interpreting, using a controller, the at least one of the brake position signal or the clutch position signal, and vehicle dynamics information, determining, using the controller, a failure of at least one of the clutch position sensor or the brake position sensor in response to the vehicle dynamics information and the at least one of the clutch signal or the brake signal, determining the presence of at least one of a vehicle acceleration event and a vehicle deceleration event, and determining failure of the brake sensor in response to the at least one of the vehicle acceleration event and the vehicle deceleration event, and determining a duration of the brake position signal indicating engagement of a parking brake.

20. The method of claim 19, further comprising:

determining an estimated stop timing of a braking event, and interpreting a duration of the vehicle deceleration event, wherein, in the vehicle deceleration event, a speed of a vehicle drops from a first speed value to a lower speed, and wherein failure of the brake sensor is determined in response to the duration of the vehicle deceleration event and a brake signal value during the vehicle deceleration event.

21. The method of claim 19, further comprising:

determining a duration of the vehicle acceleration event, and comparing the duration of the vehicle acceleration event to vehicle sensor information so as to determine the failure of the at least one of the clutch position sensor or the brake position sensor, wherein in the vehicle acceleration event, a speed of a vehicle increases from below a first speed value to above a second speed value.

22. The device of claim 3, wherein:

the vehicle dynamics module is further structured to determine a duration of sustained speed of a vehicle, and compare the duration of the sustained speed to information from the sensor diagnostics module so as to determine the failure of the brake position sensor, the sustained speed being a speed above a first speed value.

23. The device of claim 4, wherein:

the vehicle dynamics module is further structured to determine a duration of sustained speed of a vehicle, and compare the duration of the sustained speed to information from the sensor diagnostics module so as to determine the failure of the brake position sensor, the sustained speed being a speed above a first speed value.

24. The system of claim 15, wherein:

the vehicle dynamics module is further structured to determine a duration of sustained speed of a vehicle, and compare the duration of the sustained speed to information from the sensor diagnostics module so as to determine the failure of the brake position sensor, the sustained speed being a speed above a first speed value.

25. The system of claim 17, wherein:

the vehicle dynamics module is further structured to determine a duration of sustained speed of a vehicle, and compare the duration of the sustained speed to information from the sensor diagnostics module so as to determine the failure of the brake position sensor, the sustained speed being a speed above a first speed value.

* * * * *